Dec. 12, 1961  G. M. DICK  3,012,564
AUTO RINSE APPARATUS
Filed Aug. 4, 1958  3 Sheets-Sheet 1

INVENTOR.
GEORGE M. DICK
BY
ATTORNEY

Dec. 12, 1961 G. M. DICK 3,012,564
AUTO RINSE APPARATUS
Filed Aug. 4, 1958 3 Sheets-Sheet 2

INVENTOR.
GEORGE M. DICK
BY
ATTORNEY

Dec. 12, 1961     G. M. DICK     3,012,564
AUTO RINSE APPARATUS
Filed Aug. 4, 1958     3 Sheets-Sheet 3
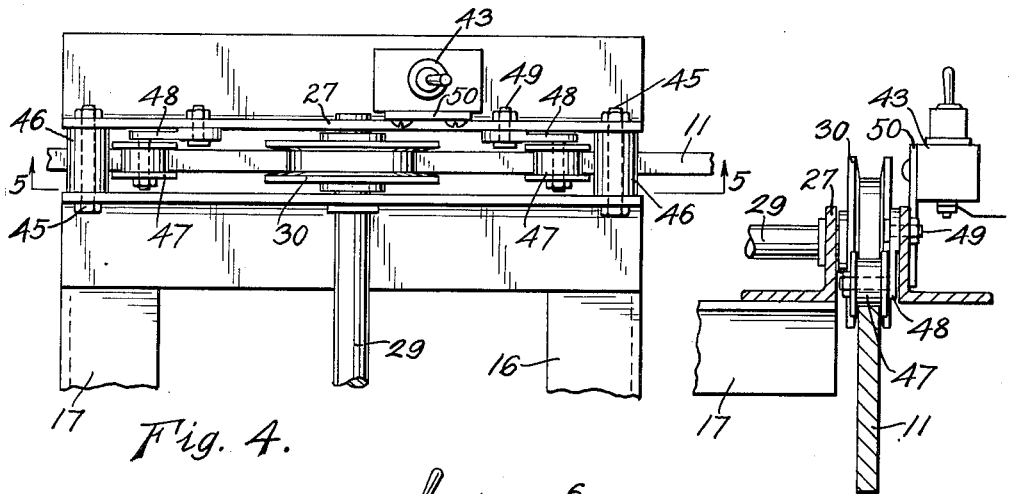
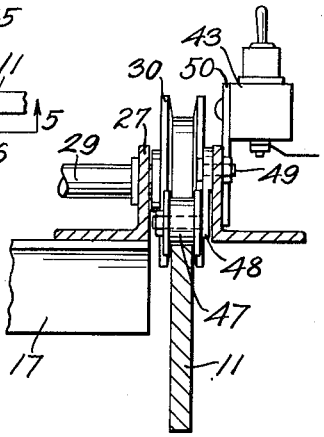
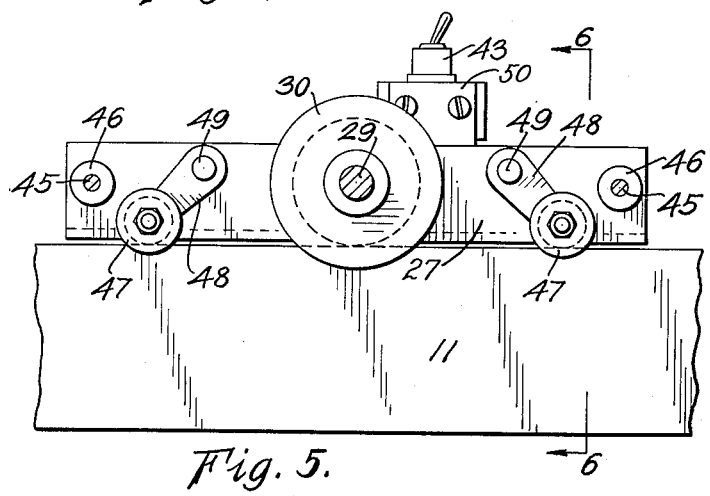
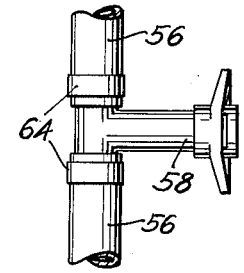
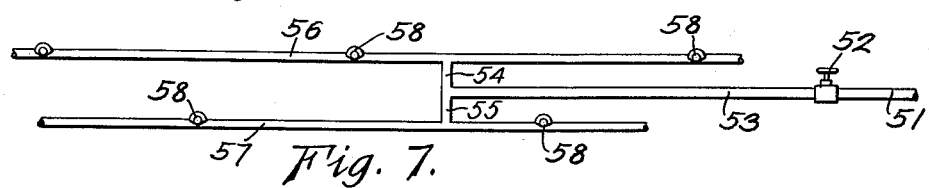
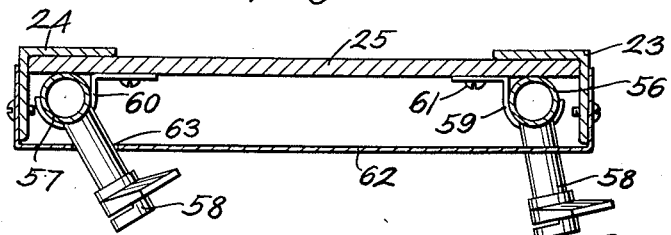
INVENTOR.
GEORGE M. DICK
ATTORNEY

United States Patent Office 3,012,564
Patented Dec. 12, 1961

3,012,564
AUTO RINSE APPARATUS
George M. Dick, 1785 Trenton, Denver, Colo.
Filed Aug. 4, 1958, Ser. No. 752,931
9 Claims. (Cl. 134—58)

This invention relates to an auto rinsing machine and more particularly to novel improvements in an auto rinsing machine of the type for use with a low pressure water system.

A primary object of this invention is to provide an improved auto rinsing machine which will provide in sequence a soaking rinse and a final rinse of a stationary vehicle.

Another important object of the invention is to provide an improved auto rinsing machine which is compact, sturdy and efficient and may be easily installed in any service station by the operator and does not require special service for either the electrical or water connections.

Most units which presently are being manufactured for the purpose incorporate a washing and drying function and either require the storage of water and compressed air for propulsion of the water or heavy centrifugal pumps to boost the existing water pressures to 300 p.s.i. or more. These units are complicated and costly to manufacture and are above the means of the ordinary service station operator to purchase and install himself.

The primary aim and purpose of this invention is to eliminate the above defects and to provide an inexpensive and uncomplicated auto rinsing machine which can be easily installed and connected to existing utility service facilities.

In general, a meritorious and outstanding feature of this invention resides in the use of water at normal main pressures to drive the water through a circulating system mounted on a frame forming a spray loop encompassing a vehicle. The spray frame is suspended from tracks which are supported from the floor or ground by means of posts or from the walls, if desired. The spray loop is motorized and adapted to traverse the rails forming the tracks and be automatically reciprocated over the vehicle in response to movement of the frame.

These and other and further objects and advantages will be more apparent as the description proceeds, as defined by the following claims and illustrated in the accompanying drawings, wherein:

FIGURE 4 is a top view of one side rail of the track showing details of mounting the frame for movement thereon;

FIGURE 5 is an elevational view along line 5—5 of FIGURE 4;

FIGURE 6 is an end view partly in section, along line 6—6 of FIGURE 5;

FIGURE 7 shows the details of the water distribution system as mounted on the frame;

FIGURE 8 is a sectional view, to an enlarged scale, through one leg of the frame along line 8—8 of FIGURE 1; and, FIGURE 9 shows the connection for one spray head of the spray loop.

Figure 1:
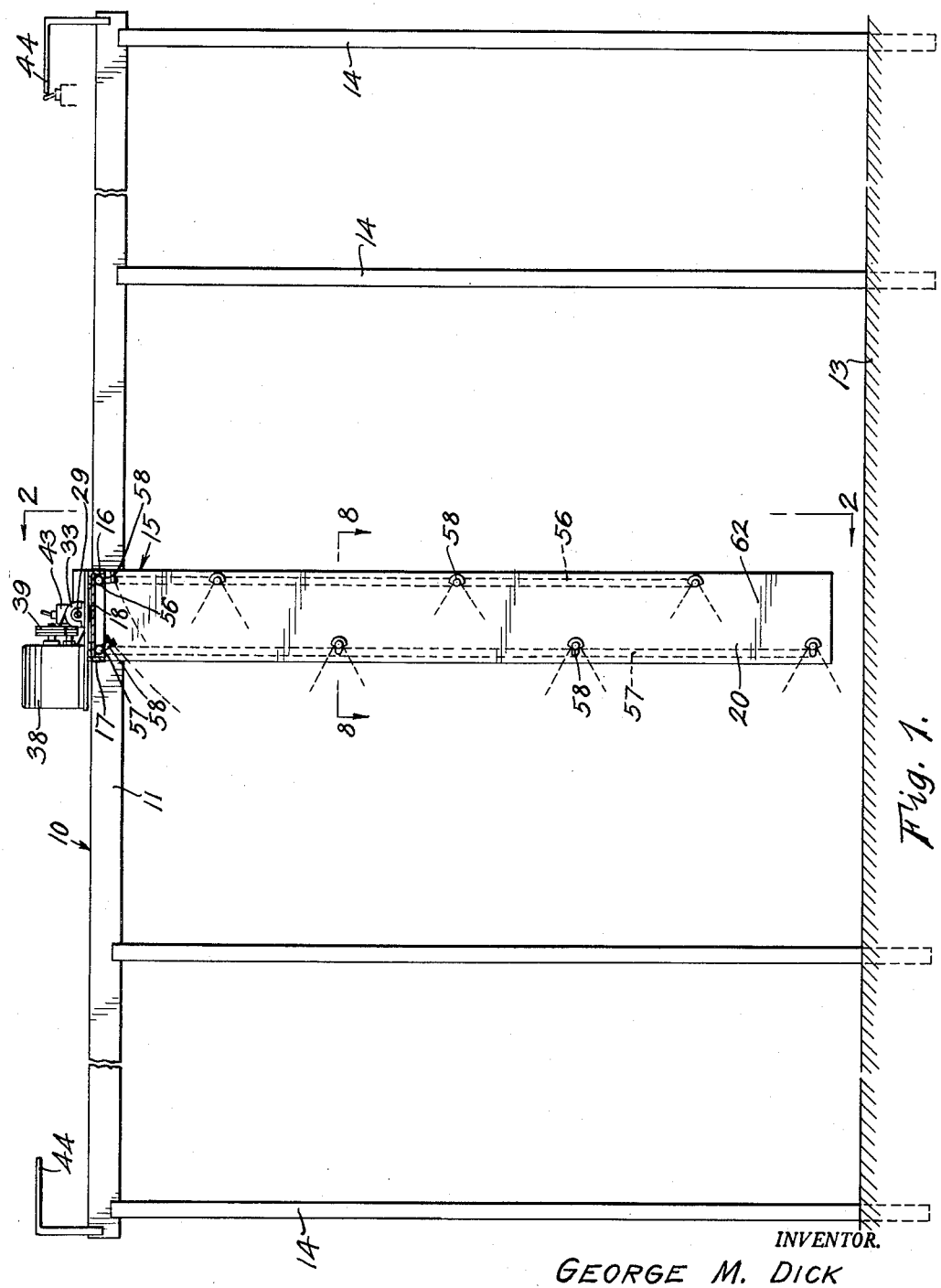
FIGURE 1 is a side elevation of the improved auto rinse device according to the invention, and taken along line 1—1 of FIGURE 2.
Figure 2:
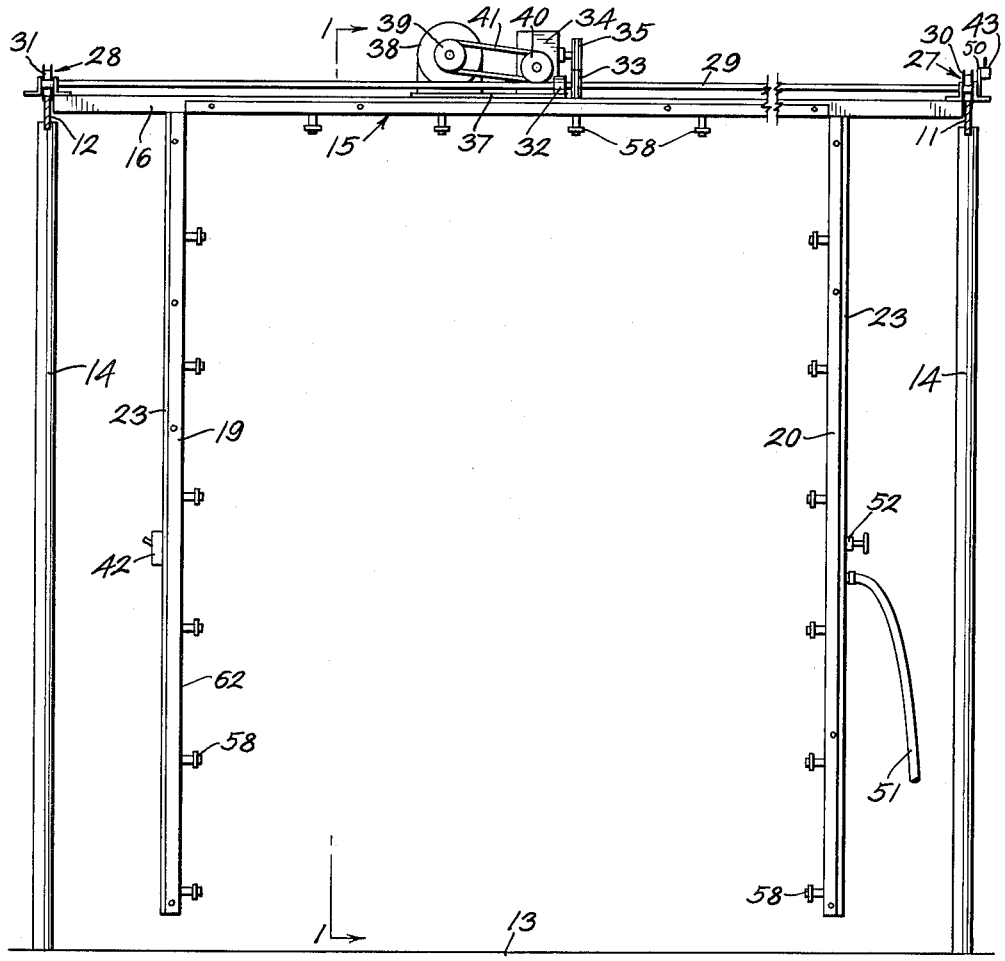
FIGURE 2 is an end view taken along line 2—2 of FIGURE 1.
Figure 3:
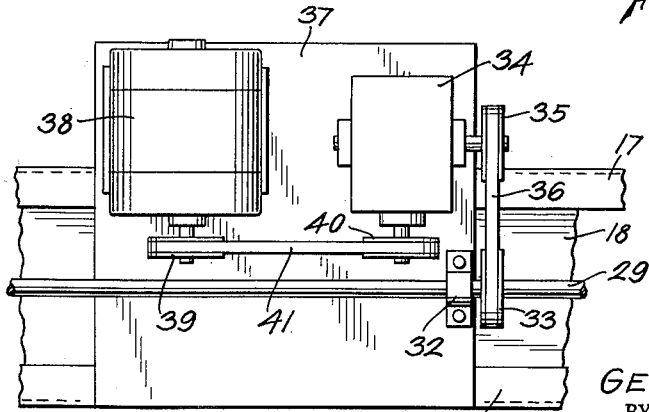
FIGURE 3 is a top view to an enlarged scale showing the motor drive in detail.

Referring to FIGURES 1 and 2, there is shown a track 10 made up of a pair of rails 11 and 12 supported above the floor 13 by means of a plurality of posts 14 and the like. A frame 15 having a pair of horizontal cross members 16 and 17 connected together by webs 18, all of which may conveniently be formed of angle bars connected by bolts and the like. The frame is further seen to include vertical depending legs 19 and 20 adjacent either end thereof, each being formed of a pair of members 23 and 24 which may be angle bars connected by means of webs 25. This preferred construction is sturdy, lightweight and relatively inexpensive although other construction details may be used. A bearing 27 and 28 is located at either end of the horizontal cross members. A shaft 29 having journals are journalled within the bearings and a pair of pulley wheels 30 and 31 are fixedly secured to the shaft in position to ride respectively on rails 11 and 12. Shaft 29 is provided with another journal intermediate the ends which is journalled in bearing 32. A pulley 33 is fixedly mounted on shaft 29 adjacent bearing 32 and a speed reducer 34 has a slow speed shaft connected to drive pulley 33 and shaft 29 as by means of pulley 35 and belt 36. Speed reducer 34 is mounted on a base 37, also having motor 38 mounted thereon and connected to drive the high speed shaft of speed reducer 34 by means of pulley 39 on the motor, pulley 40 on the speed reducer and belt 41. On being energized, motor 38 drives speed reducer 34 which in turn drives shaft 29 and pulleys 30 and 31 propelling frame 15 along rails 11 and 12 in a direction depending on the direction of rotation of motor 38. Motor 38 is connected to a source of electrical current, not shown, through manually operated switch means 42, seen to be located on one of the vertical members of frame 15. A motor reversing switch 43 is located at one end of the horizontal cross members of frame 15 and an actuating means 44 is located at either end of the corresponding rail. As the frame is traversed and approaches the end of the track, actuating means 44 engages and actuates switch 43, reversing the direction of rotation of motor 38 causing the motion of frame 15 to be reversed in direction.

Referring now to FIGURES 4, 5 and 6, bearings 27 and 28 are each seen to comprise a pair of angle bars held together by means of bolts 45 and having the vertical webs held in spaced relation by spacers 46. Pulley 30 is seen to be positioned between the vertical webs of the angle bars making up bearings 27 and 28 with shaft 29 being journalled in both vertical webs. A pair of guides 47 are positioned to either side of pulley 30 along rail 11 to engage the rail and prevent the frame from skewing. Guides 47 may be in the form of pulleys and be mounted on arms 48 which are pivotally mounted on the outer vertical web of the bearings by means of bolts 49. Reversing switch 43 is mounted on the outer vertical web of bearing 27 by means of a bracket 50 and positioned at a height such that the actuating means 44 will engage switch 43 to reverse the direction of rotation of motor 39 at each end of track 10.

Referring to FIGURES 1, 2 and 7, conduit 51 is connected to a source of water under pressure, not shown. The flow of water into main supply line 53 is controlled by a valve 52. Water flows by means of branch lines 54 and 55 from supply line 53 into feeder lines 56 and 57. Spray heads 58 are located in staggered relation along the length of the feeder lines. Branch lines 54 and 55 are centrally positioned in the horizontal cross members of frame 15 and a feeder line is located within each angle bar to extend to the lower portion of the vertical members of frame 15. As seen in FIGURES 1 and 7, spray heads 58 in line 56 are in staggered relation to heads in line 57. This arrangement provides a more uniform distribution pattern and reduces the number of heads. By using this arrangement, an efficient rinsing action takes place with ordinary main pressures without the necessity of additional pumps or compressed air boosters. It will be noted that spray heads 58 are preferably of a type that produces a spray through 90° or less and the sprays are directed in the direction of one end of the track 10. FIGURE 8 shows a cross section through a vertical member 20 and two heads positioned therein. As shown, lines 56 and 57 are secured to web 25, which may conveniently be a solid plate, by means of brackets 59 and 60 by screws 61 and the like. A cover plate 62 may be secured to angle bars 23 and 24 as by bolts and positioned to cover lines 56 and 57, being provided with holes 63 of a size to accommodate heads 58. FIGURE 9 illustrates the manner of attaching a head into a feeder line. Line 56 is separated at the appropriate points and the head is inserted. Where line 56 is a plastic pipe, clamps 64 secure the line to the head forming a water tight connection.

In operation, with the electrical and low pressure water service connected, a vehicle is run under track 10 from the right side in FIGURE 1. Frame 15 is positioned at the right end of track 10 from a previous rinsing. Switch 42 is turned on and water valve 52 is opened. Frame 15 and associated sprays are traversed to the left as the washing operation is started at the left or front end of the vehicle. The washing operation progresses to the right and the speed of frame 15 is such that the washing operation and frame 15 meet and cross near the center of the vehicle. Frame 15 continues to the left rinsing the dirty water from the vehicle while the washing operation is being completed. Frame 15 reverses when actuating means 44 engages switch 43 and the vehicle is subjected to another complete rinse. It will be understood that this sequence is preferred but others may be used to advantage. It is contemplated that the movement of frame 15 be terminated at the right end of track 10 either manually or automatically as desired. It is to be further understood that conduit 51 be of a sufficient length to permit frame 15 to completely traverse track 10. Conduit 51 may be involuted and supported above the floor by means of springs, not shown, and the like.

Since the rinse device of the present invention may be installed free-standing, the installation need not be within a building. The only requirement being that electrical service and low pressure water service be available.

It has been found with the present rinsing device, that with a minimum of expenditure, a service station operator can double and triple the output of vehicles from his wash operation without the need for expensive and complicated pumps and pressure boosters.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A vehicle rinsing machine for use with a low pressure water system comprising a movable inverted U-shaped spray unit adapted to encompass the top and sides of a vehicle to be rinsed, horizontally disposed guiding and supporting means for the spray unit, said spray unit being comprised of a frame having spaced depending legs, each of said legs and said frame being formed of a pair of angle bars and webs connecting each pair of bars, a spray line for conveying fluid from a single source mounted within each angle bar, spray nozzles arranged in staggered relation on the lines extending laterally therefrom and disposed inwardly of the frame for spraying fluid onto the surface of the vehicle in a direction approximately paralleling the direction of movement of the spray unit and means for controlling the flow of fluid through the lines.

2. A vehicle rinsing machine for use with a low pressure water system comprising a reciprocable inverted U-shaped spray unit, guiding and supporting means for said spray unit, said spray unit having a frame with spaced depending legs, each of said legs and said frame being formed of a pair of angle bars connected by a web therebetween, a water supply conduit, a control valve in said supply conduit, a pair of branch lines connected to said supply conduit with a branch line positioned within the legs of the angle bars at each edge of the frame, spray nozzles extending laterally from the lines and disposed in staggered relation on the respective lines to spray inwardly of the depending legs of the spray unit, means mounted on said spray unit cooperating with said supporting and guiding means to support said spray unit for movement along a predetermined path and means for moving said spray unit along said path of travel comprising a prime mover mounted on said spray unit, drive means operatively connected to and driven by said prime mover to engage said supporting means and move said spray unit therealong, said spray nozzles having a spray arc not in excess of about 90° with all nozzles being positioned to direct the spray toward one end of the guiding and supporting means.

3. A vehicle rinsing machine for use with a low pressure water system comprising a reciprocable inverted U-shaped spray unit, guiding and supporting means for said spray unit having a frame with spaced depending legs, each of said legs and said frame being formed by a pair of angle bars connected by a web therebetween, a water supply conduit, a control valve in said supply conduit, a pair of branch lines connected to said supply conduit with one branch line positioned within each angle bar forming the frame, spray nozzles extending laterally from the lines and disposed in staggered relation on the respective lines to spray inwardly of the depending legs of the spray unit, cover means for the inner side of the U-shaped spray unit having openings therein to receive the nozzles, means mounted on said spray unit cooperating with said supporting and guiding means to support said spray unit along said path of travel comprising a motor mounted on said spray unit, a pair of pulleys connected to and driven by said motor, said pulleys engaging said supporting means to move the spray unit therealong, said spray nozzles having a spray arc not in excess of about 90° with all nozzles being positioned to direct the spray toward one end of the guiding and supporting means.

4. A vehicle rinsing unit in accordance with claim 3 wherein the motor is a reversible motor, and there is a reversing switch carried by the spray unit operatively connected to the motor and actuating means mounted on said supporting means for actuating the switch to reverse the motor at selected positions along the path of travel.

5. A vehicle rinsing apparatus as set forth in claim 3 wherein the supporting means comprises a pair of horizontally spaced tracks and each of the pair of pulleys is positioned to engage one of the pair of tracks.

6. In a vehicle rinsing machine for use with a low pressure water system having a U-shaped frame for movement over a vehicle to be rinsed, said frame including two substantially U-shaped conduits mounted in inverted position in parallel relation to each other on said frame adapted to be directly connected to a source of utility water, spray nozzles arranged on the conduits to direct water onto a vehicle during the movement of the frame over a vehicle in a direction approximately paralleling such movement, said nozzles extending from the conduits and disposed in staggered relation on the respective lines to spray inwardly of depending legs of the frame.

7. A vehicle rinsing machine for use with a low pressure water system comprising a horizontally disposed overhead supporting track, supporting means adapted to support said track in elevated position, a U-shaped frame, means mounted on said frame cooperating with said track to support said frame for movement along a predetermined path of travel over a vehicle to be rinsed, said frame including two substantially U-shaped conduits mounted in inverted position in parallel relation to each other on said frame adapted to be directly connected to a source of utility water, spray nozzles arranged on the conduits to direct liquid onto a vehicle during the movement of the frame over a vehicle, said nozzles extending from the conduits and disposed in staggered relation on the respective conduits to spray inwardly of depending legs of the frame and means for moving said frame along the track comprising a prime mover mounted on said frame, drive means operatively connected to and driven by said prime mover to engage said track and move said frame therealong, said spray nozzles having a spray arc not in excess of about 90° with all nozzles being positioned to direct the spray toward one end of the guiding and supporting means.

8. A vehicle rinsing machine for use with a low pressure water system comprising a horizontally disposed overhead spaced pair of supporting tracks, supporting means adapted to support said tracks in elevated position, a U-shaped frame, means mounted on said frame cooperating with said tracks to support said frame for movement along a predetermined path of travel over a vehicle to be rinsed, said frame including two substantially U-shaped conduits mounted in inverted position in parallel relation to each other on said frame adapted to be directly connected to a source of utility water, spray nozzles arranged on the conduits to direct liquid onto a vehicle during the movement of the frame over a vehicle, said nozzles extending from the conduits and disposed in staggered relation on the respective conduits to spray inwardly of depending legs of the frame and means for moving said frame along the tracks comprising a motor carried by said frame, a pair of pulleys connected to and driven by said motor with each pulley of the pair engaging one of the supporting tracks, said spray nozzles having a spray arc not in excess of about 90° with all nozzles being positioned to direct the spray toward one end of the guiding and supporting means.

9. A vehicle rinsing machine in accordance with claim 8, wherein the motor is a reversible motor, and there is a reversing switch operatively connected to the motor carried by the frame and actuating means mounted on a track for actuating the switch to reverse the motor at selected positions along the path of travel.

References Cited in the file of this patent

UNITED STATES PATENTS

| | | |
|---|---|---|
| 2,703,579 | Merancy | Mar. 8, 1955 |
| 2,751,915 | Roberts | June 26, 1956 |
| 2,764,893 | Falkenberg | Oct. 2, 1956 |
| 2,867,226 | Williams | Jan. 6, 1959 |